United States Patent
Shaikh et al.

(10) Patent No.: US 10,572,322 B2
(45) Date of Patent: Feb. 25, 2020

(54) NETWORK CONTROL PLANE DESIGN TOOL

(71) Applicant: AT&T Intellectual Property I, L.P., Atlanta, GA (US)

(72) Inventors: Aman Shaikh, Berkeley Heights, NJ (US); Kevin D'Souza, Cranbury, NJ (US); Leah Zhang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 246 days.

(21) Appl. No.: 15/498,761

(22) Filed: Apr. 27, 2017

(65) Prior Publication Data

US 2018/0314612 A1   Nov. 1, 2018

(51) Int. Cl.
*H04L 12/24* (2006.01)
*G06F 11/00* (2006.01)
*H04L 12/26* (2006.01)

(52) U.S. Cl.
CPC .......... *G06F 11/004* (2013.01); *H04L 41/145* (2013.01); *H04L 43/50* (2013.01); *H04L 41/0856* (2013.01)

(58) Field of Classification Search
CPC ....... G06Q 10/067; H04L 41/12; H04L 45/74; H04L 63/102; H04L 41/0856; H04L 41/145; H04L 43/50; H04W 12/02; G06F 11/004
See application file for complete search history.

(56) References Cited

U.S. PATENT DOCUMENTS

| | | | |
|---|---|---|---|
| 6,411,923 B1 | 6/2002 | Stewart et al. | |
| 7,363,285 B2 | 4/2008 | Kalyanaraman et al. | |
| 9,313,097 B2 | 4/2016 | Barabash et al. | |
| 2003/0051032 A1* | 3/2003 | Schenkel | H04L 41/12 709/224 |
| 2004/0024859 A1 | 2/2004 | Bloch et al. | |
| 2012/0069131 A1* | 3/2012 | Abelow | G06Q 10/067 348/14.01 |
| 2014/0337500 A1* | 11/2014 | Lee | H04L 41/12 709/223 |
| 2015/0010153 A1* | 1/2015 | Robertson | H04W 12/02 380/270 |
| 2016/0219024 A1* | 7/2016 | Verzun | H04L 63/102 |
| 2016/0294922 A1 | 10/2016 | Walls et al. | |
| 2017/0134274 A1* | 5/2017 | Ara jo | H04L 45/74 |

FOREIGN PATENT DOCUMENTS

FR        2882603 A1    9/2006
WO    WO 2006/092481 A2   9/2006

OTHER PUBLICATIONS

Zheng et al.; "LazyCtrl: A Scalable Hybrid Network Control Plane Design for Cloud Data Centers"; IEEE Transactions on Parallel and Distributed Networks; 28.1; 2017; 12 pages.
Li et al.; "Design of Control Plane Architecture Based on Cloud Platform and Experimental Network Demonstration for Multi-domain SDON"; Journal of Physics: Conference; 679; 2016; 7 pages.
Davie et al.; "A Database Approach to SDN Control Plane Design"; ACM SIGCOMM Computer Comm. Review; 47.1; Jan. 2017; p. 15-26.

* cited by examiner

*Primary Examiner* — Le H Luu

(74) *Attorney, Agent, or Firm* — BakerHostetler

(57) ABSTRACT

Systems and methods provide design and testing for a control plane of a network region.

20 Claims, 5 Drawing Sheets

100

| VNF 102a | VNF 102b | VNF 102b |

HIGHER LAYER TOOLS/SERVICES: ORCHESTRATION, SDN CONTROLLERS, ET CETERA
104

APPLICATION PROGRAMMING INTERFACE (API)
106

CLOUD SERVICES: COMPUTE, STORAGE, NETWORK, IDENTITY, SECURITY, ET CETERA
108

| PHYSICAL HARD-WARE 110a | PHYSICAL HARD-WARE 110b | PHYSICAL HARD-WARE 110c |

FIG. 1A

NETWORK CONTROL PLANE DESIGN TOOL

TECHNICAL FIELD

The disclosures herein generally relate to network technologies. In particular, the disclosures relate to designing and analyzing a control plane in a network.

BACKGROUND

Network planning and design is a complex process which is constantly changing based on changing needs of the organizations implementing the networks as well as technical evolution of hardware and software within the networks.

The topological design is frequently a manual process of studying needs and resources, and conducting short-, medium-, and long-term planning, information technology sourcing, and operations and maintenance. Network synthesis and network realization follow topological design. At various stages, manually generated diagrams or models may be produced to capture design plans and provide opportunities for analysis.

However, manual preparation may lead to errors in consistency and accuracy. Further, it may be difficult to capture protocols or properties of different network planes or systems, and a challenge to maintain up-to-date information on ever-evolving resources. Inspection of the design is also challenging, resulting in a likelihood that extensive testing will be required before the network design is made available to its users.

SUMMARY

An embodiment of a control plane design tool can comprise a region component configured to define a region model of a network region, wherein the region model has region data including region protocols. The tool can also comprise a systems component configured to define a system model of a network system within the network region, wherein the system model has system data including system properties. The tool can also comprise a model generation component configured to generate a control plane model of the network region including the system model.

In another embodiment, a method can comprise receiving region data related to a network region, wherein the region data includes region protocols. The method can also comprise generating a region model based on the region data. The method can also comprise receiving system data related to system within the network region, wherein the system data includes system properties. The method can also comprise generating a system model based on the system data. Finally, the method can also comprise generating a control plane model for the network region based on the region model and the system model.

In still another embodiment, a system can include means for generating a region model of a network region based on region data including region protocols. The system can also include means for generating a subsystem model of a subsystem in the network region based on subsystem data including subsystem properties. The system can also include means for generating a control plane model for the network region based on the region model and the system model.

These and other embodiments are described in greater detail elsewhere herein. In some of the following descriptions a particular embodiment and its details are used to illustrate the disclosed aspects. The applicability of the method is not limited to the particular embodiments described herein.

BRIEF DESCRIPTION OF THE DRAWINGS

To better understand and appreciate the disclosed aspects, refer to the following detailed description in connection with the accompanying drawings:

FIG. 1A shows a representation of an example system for utilizing virtualization and provides details on implementation of aspects herein;

DETAILED DESCRIPTION

Figure 1B:
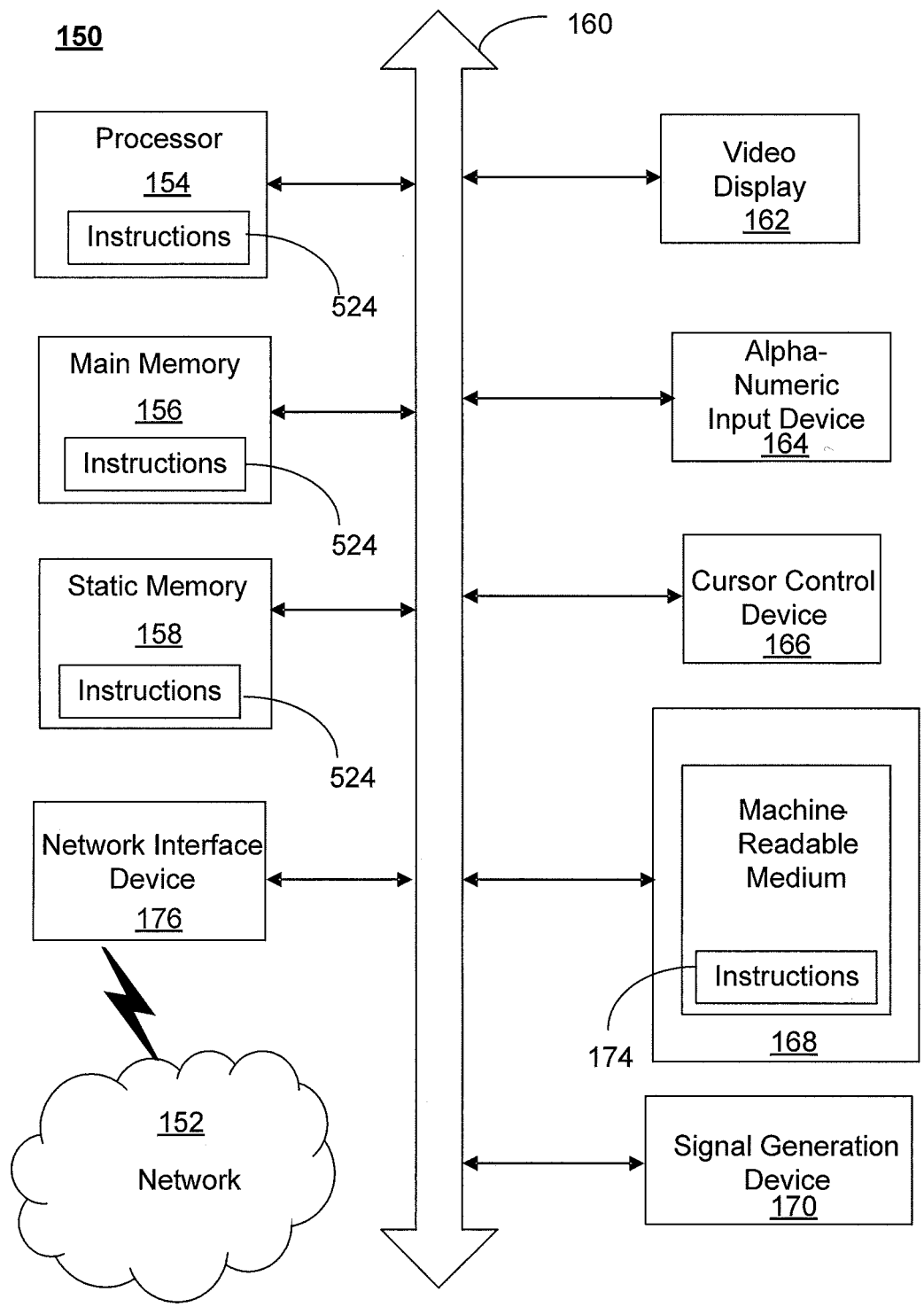
FIG. 1B shows an example machine for use with aspects herein.

The subject innovation generally concerns a tool that facilitates design of control plane (i.e., routing) architecture for an internet protocol (IP) network. The tool can be vender-neutral and support manual interaction with a human designer or perform various automated tasks or processes related to design or testing with respect to a network region.

Software and hardware systems on networks perform activities which can be defined according to different planes, such as the data plane (on which the system processes network traffic, typically providing the intended functionality), the management plane (on which the system interacts with its owner, control element, network management system, or orchestration system), and the control plane. In IP networks, the control plane determines how data traffic flows through the network. The control plane is defined in part by various control plane protocols, as well as the properties of the systems (e.g., machines, elements, nodes, et cetera, in or on the network) within network regions governed by the control plane. Improper design of the control plane or integration of systems can result in network errors including but not limited to erroneous flow of data traffic.

Existing processes for designing or modifying the control plane of a network region involve manual effort (e.g., the drafting and development of visual representations in diagramming, image editing, or presentation software). Such processes can be laborious and error-prone. These challenges will only be magnified as networks continue to evolve. Control plane design is becoming more complicated as nwork service providers evolve networks to use Network Function Virtualization (NFV) and Software-Defined Networking (SDN), along with new control plane protocols such as, e.g., Border Gateway Protocol (BGP) Labeled Unicast, Ethernet Virtual Private Network (EVPN), and Segment Routing (SR).

To expedite and aid design, implementation, and management of a control plane, a control plane design tool and control plane design methods are disclosed. The disclosed control plane design tool allows systematic exploration of network regions during the control plane design process, and then allows manual or automatic inspection of various parameters of the design. This allows for faster and more accurate control plane design along with a robust process for "debugging" this essential element of network architecture. The improved design and testing process is valuable in all IP network design, and may provide particular benefits in D2 networks implementing control plane technologies such as BGP Labeled Unicast, EVPN, SR, and others.

The network designer will have access to models of various control plane protocols (e.g., Open Shortest Path First (OSPF), BGP, BGP Labeled Unicast, EVPN, SR). A designer or automated process can specify network design by region. The protocols for each region, as well as the systems therein (e.g., nodes and links interconnecting nodes) can be selected from existing templates or defined anew.

Once a model of the network is created from this information, the model can be checked for function and correctness. Examples of properties which can be inspected include reachability, vulnerability, scalability (and/or load management), et cetera. Network regions can also be inspected for risk or presence of control plane loops. For example, a determination as to whether reachability between various parts of the network is attained or as intended can be made. In another example, vulnerabilities associated with possible errors or network failures can be identified. In another example, an expected control plane load (e.g., number of routes) on devices, software defined network (SDN) controllers, and/or control plane monitors can be analyzed. In another example, a determination can be made as to the time for the network to re-converge following failures, upgrades, or other control plane events. In another example, a determination can be made to assess possible redesign or modification where scale limits (e.g. warning thresholds or failures) are reached.

The control plane design tool and disclosed methodologies can be described in two parts: specification of regions, including control plane protocols for the regions and interconnection of the regions; and specification of systems (e.g., virtual or physical devices, nodes, elements, et cetera) and their roles in each region. Interconnecting links between systems can also be specified.

In embodiments, libraries of information relating to regions, region protocols, systems, system properties, et cetera can be stored and provided. In embodiments, the libraries can be private or shared. In embodiments, the libraries can be updated based on information promulgated from third parties such as vendors (e.g., of network hardware or services, of systems used on or with the network), tool managers or network administrators, or others. In this fashion, new or modified control plane protocols or system properties can be integrated or added to available sets seamlessly as they become available.

In embodiments, plug-ins can be provided for interacting with existing systems and software used by network designers, administrators, and others.

A "component" used herein can be hardware, software, or a combination thereof, and can be implemented by or stored on circuits, processors, or non-transitory computer readable media.

Turning to the drawings, FIG. 1A is a representation of an example system 100 (e.g., cloud computing platform, virtualized environment, network) showing techniques for implementing aspects disclosed herein. System 100 may comprise a cloud computing platform with a SDN.

The physical hardware of the cloud platform may comprise multiple servers 110a, 110b, 110c.

The cloud computing nodes, controller nodes, networking nodes, etc. which provide the compute, storage, networking, identity, security and other cloud services 108 are implemented on the hardware 110a, 110b, 110c. In embodiments, customized or special-purpose hardware may be utilized without departing from the scope or spirit of the innovation.

An Application Programming Interface (API) 106 into the cloud services is available for constructing higher layer services. Higher layer services 104 such as SDN controllers, Firewall as a Service, Dashboards, and Orchestration tools, et cetera, may be implemented using the API 106.

Virtual Network Functions (VNFs) 102a, 102b, 102c, et cetera, may use the higher layer services 104, as well as, the API 106 to create virtual network function modules that implement various network functions. Various aspects herein can be implemented as virtual network functions, such as systems in a network region, management elements of the network region itself, et cetera. Further, the control plane tool and techniques for developing control planes described herein can be implemented as applications, models, or other software which are virtualized.

System 100 of FIG. 1A can be used to implement distributed virtual network functions on all or some nodes of a network. This can be achieved by one or many replicas of the cloud computing platform, or components thereof. In embodiments, network elements such as gateways, routers, mobility management entities, home subscriber servers, et cetera, can be implemented as virtualized instances.

FIG. 1B depicts an example diagrammatic representation of a machine in the form of a computer system 150 within which a set of instructions, when executed, may cause the machine to perform any one or more of the methods described above. One or more instances of the machine can operate, for example, servers 110 and/or other devices described herein. In some embodiments, the machine may be connected (e.g., using a network 152) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 150 may include a processor (or controller) 154 (e.g., a central processing unit (CPU)), a graphics processing unit (GPU, or both), a main memory 156 and a static memory 158, which communicate with each other via a bus 160. The computer system 150 may further include a display unit 162 (e.g., a liquid crystal display (LCD), a flat panel, or a solid state display). Computer system 150 may include an input device 164 (e.g., a keyboard), a cursor control device 166 (e.g., a mouse), a disk drive unit 168, a signal generation device 170 (e.g., a speaker or remote control) and a network interface device 176. In distributed environments, the embodiments described in the subject disclosure can be adapted to utilize multiple display units 162 controlled by two or more computer systems 150. In this configuration, presentations described by the subject disclosure may in part be shown in a first of display units 162, while the remaining portion is presented in a second of display units 162.

The disk drive unit 168 may include a tangible computer-readable storage medium 174 on which is stored one or more sets of instructions (e.g., software) embodying any one or more of the methods or functions described herein, including those methods illustrated above. Instructions 174 may also reside, completely or at least partially, within main memory 156, static memory 158, or within processor 154 during execution thereof by the computer system 150. Main memory 156 and processor 154 also may constitute tangible, non-transitory computer-readable storage media.

Figure 2:
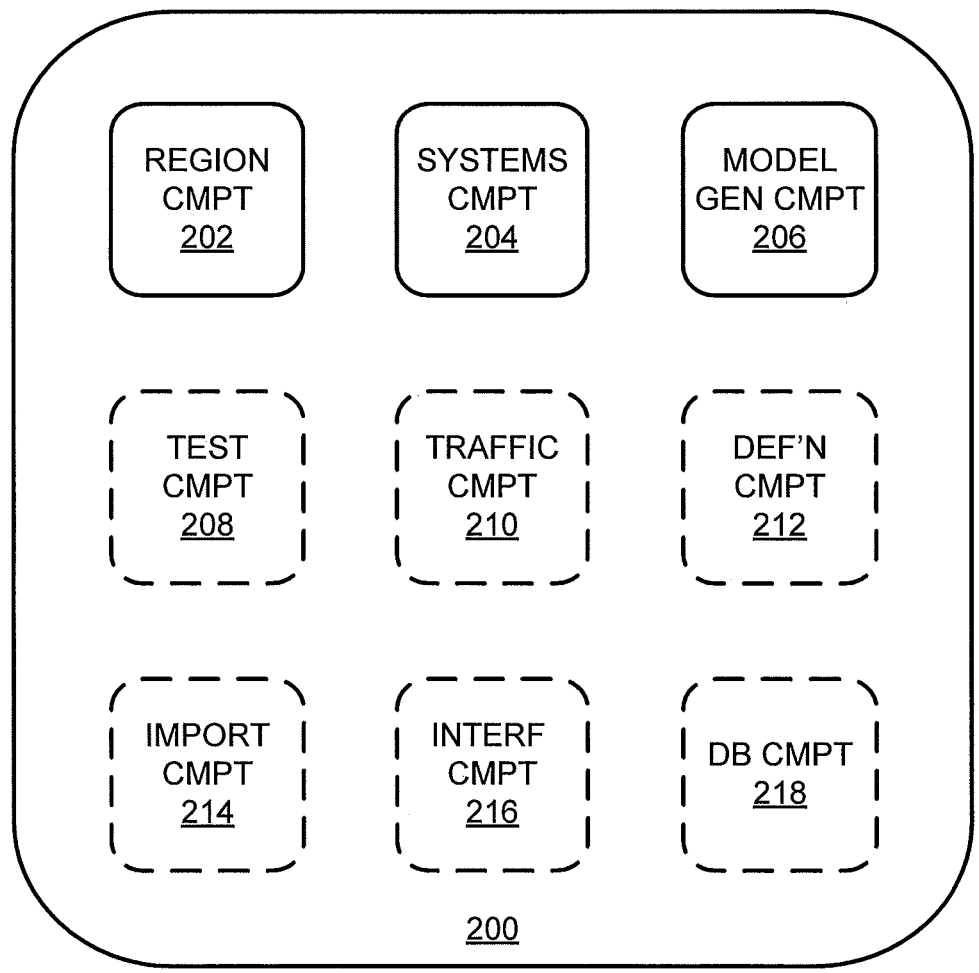
FIG. 2 illustrates a block diagram of an example control plane design tool as disclosed herein.

FIG. 2 illustrates a block diagram of an example embodiment of a control plane design tool 200 as disclosed herein. Control plane design tool 200 includes region component 202, systems component 204, model generation component 206. In embodiments, control plane design tool 200 also includes test component 208, traffic component 210, definition component 212, import component 214, interface component 216, and database component 218.

Region component 202 is configured to define a region model of a network region. As used herein, a network region can be some or all of a network. The region model is defined by and/or includes various region protocols. These can include, but are not limited to, OSPPF, BGP Labeled Unicast, EVPN, SR, and others.

Systems component 204 is configured to define a system model of a network system within the network region. The system model has system data including system properties representing the system. Such properties can include the capabilities, functionality, behavior, and other aspects of the system. Systems can be physical or virtual, and can comprise a number of devices or functions.

Model generation component 206 is configured to generate a control plane model of the network region including the system model. The model can be generated on identification of parameters and systems within a region or regions (e.g., rendered in one action), or can be generated iteratively as changes are made (e.g., rendered in an ongoing fashion based on realtime changes).

In embodiments, control plane design tool 200 also includes test component 208 which is configured to test the region protocols and the system properties within the control plane model. Testing can include inspection of various protocols and interconnecting links between or within systems or regions. Simulated action or traffic may be provided to or from the network region to determine possible outcomes. Further, rules may be tested relating to predictable issues (e.g., reachability, vulnerability, scalability, control plane loops) on network-wide, regional, or node-by-node bases to determine failure risks, inefficiencies, or unintended behavior.

In embodiments, control plane design tool 200 also includes traffic component 210 which is configured to determine load on the system based on the control plane model. Various analyses can be performed on the control plane model or other data or resources associated with control plane design tool 200. In an example embodiment, the number and size of link state advertisements (LSAs) are analyzed. The number of external LSAs, transit networks, routers, Summary LSAs, router-to-network links, router-to-router links, and stub links, as well as SR related information, can be analyzed during inspection of control plane load in a network region.

In embodiments, control plane design tool 200 also includes definition component 212 which is configured to define the region protocols. In at least one embodiment definition component 212 can also define system data such as system identification or properties. Definition component can receive definitions from various locations such as libraries or databases, or receive input from a user or system.

In embodiments, control plane design tool 200 also includes import component 214 which is configured to import control plane information from an existing network region to source the region data. In embodiments, import component 214 can auto-discover a network to which it is connected. In alternative or complementary embodiments, import component 214 can receive files or digital information (e.g., existing network diagrams or models) and import the data for use with control plane design tool 200.

In embodiments, control plane design tool 200 also includes interface component 216 configured to provide a user interface. The user interface can be used to allow user control of control plane design tool 200 and can be used to receive inputs from the user. In embodiments, interface component 216 can display a visual representation of models described herein. Graphical or textual representations of region or system data can be provided. Outputs or outcomes of inspections or testing can also be output using interface component 216. For example, actual or predicted control plane load data from traffic component as well as satisfaction or failure of rules related thereto can be shown using interface component 216. Other tested or inspected aspects can also be displayed. In embodiments, interface component 216 can provide a summary or report of one or more tested or inspected aspects relating to a control plane. In embodiments, interface component 216 can also facilitate export of data from control plane design tool 200.

In embodiments, control plane design tool 200 also includes database component 218. Database component 218 includes one or both of a protocol library and a properties library. A protocol library can include the region protocols for the network region. A properties library can include the system properties for systems interacting with or on the network. Protocols or properties can, in embodiments, be added, removed, extended, or otherwise modified within the library to accommodate the design of networks or proper modeling of existing networks.

Figure 3:
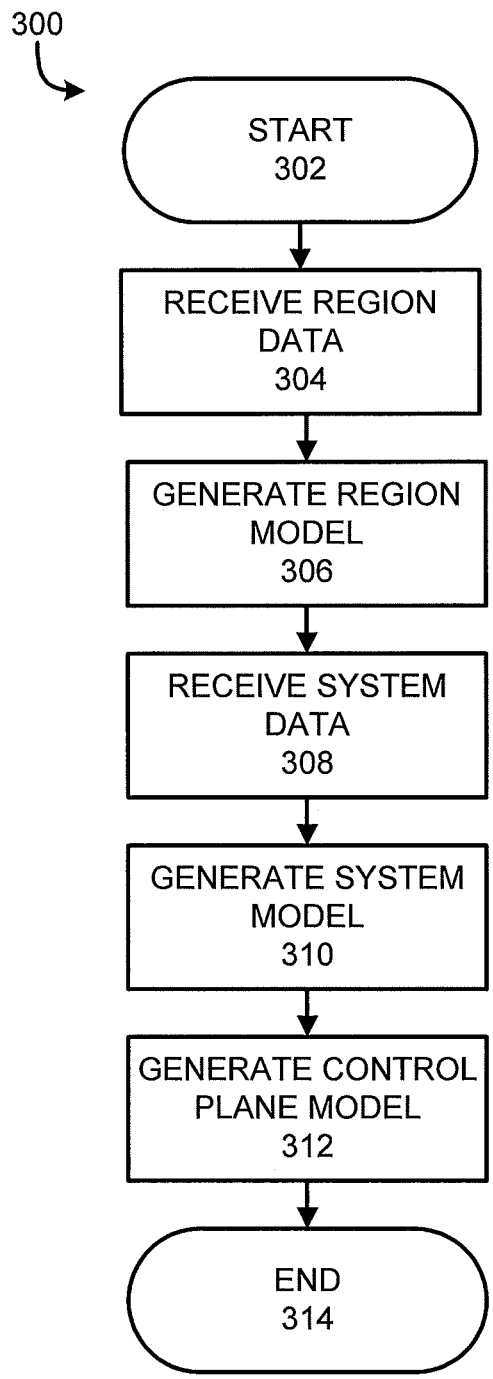
FIG. 3 illustrates a flow chart of an example methodology disclosed herein.

Turning to FIG. 3, illustrated is a flow chart of an example methodology 300 for designing and modeling a control plane of a network region. Methodology 300 begins at 302 and proceeds to 304 where region data relating to the network region is received. In embodiments, region data includes protocols with or according to which the region will operate. At 306, a region model is generated based on the region data. In embodiments, information regarding multiple regions can be received, and multiple region models can be generated, which can interact with one another or be modeled independently.

Thereafter, at 308, system data is received. System data includes properties or other information concerning systems operating on, in, or with at least one network region. The systems can thereafter be modeled at 310. In embodiments, systems are modeled within the region model. Alternatively, systems can be modeled in a standalone fashion and associated with region models.

At 312, a control plane model is generated based on the region and system models. In embodiments, additional input can be sourced for generation of the control plane model. With control plane modeling complete, methodology 300 ends at 314.

Figure 4:
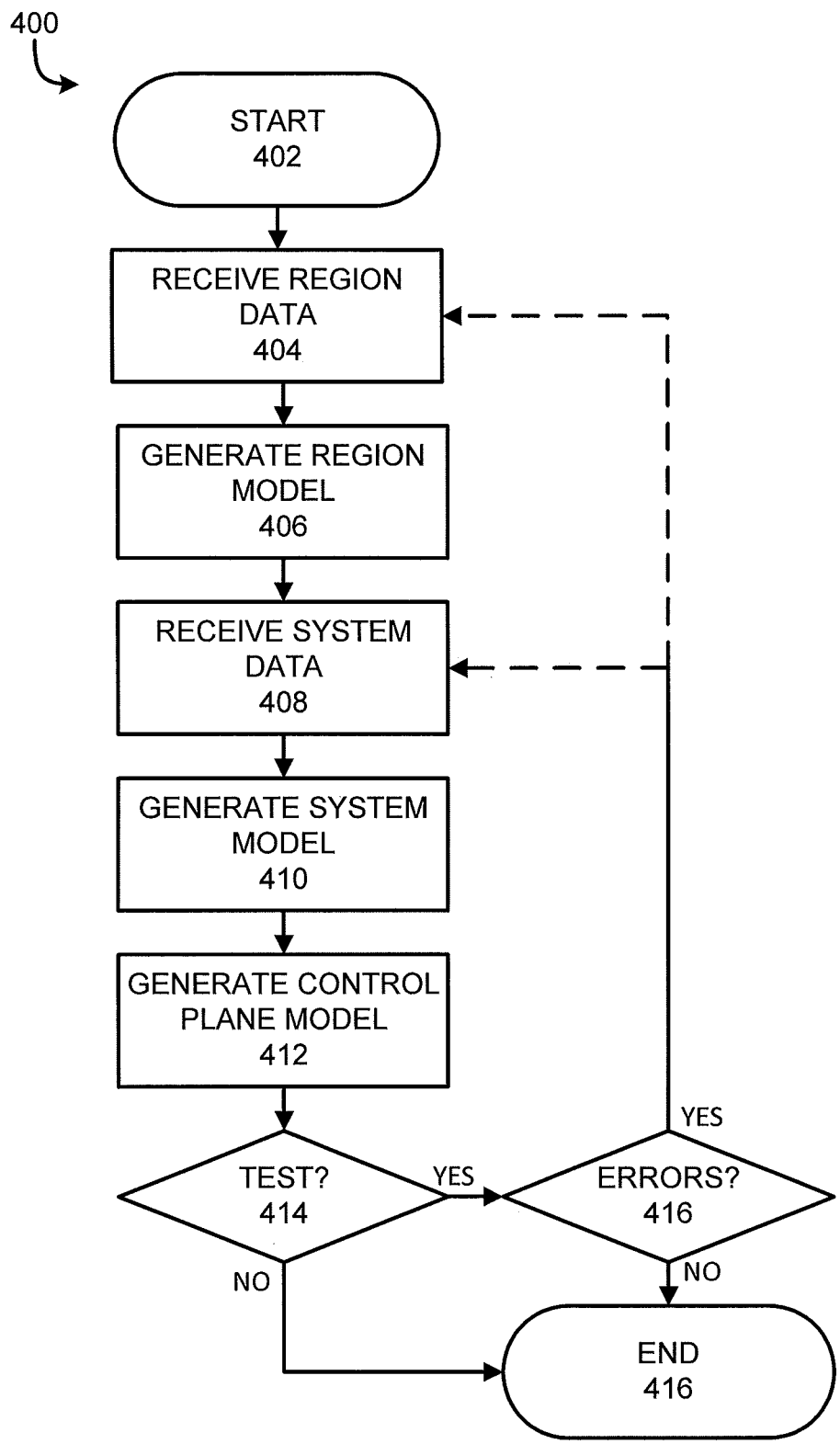
FIG. 4 illustrates a flow chart of another example methodology disclosed herein.

Turning to FIG. 4, illustrated is a flow chart of an example methodology 400 for designing and inspecting a control plane of a network region. Methodology 400 begins at 402 and proceeds to 404 where region data is received. Based on the region data, at 406, a region model is generated. Thereafter at 408, system data is received, and a system model generated at 410. Based on the region model and the system model, a control plane model is generated at 412.

At 414, a determination is made as to inspection of the control plane model. If the determination at 414 returns positive, methodology 400 advances to 416 where the control plane model is inspected for errors. If errors are found, methodology 400 can recycle to, e.g., 404 or 408 where new parameters for region or system data can be provided to implement or recommend corrective measures for the errors. Based on new region or system data, methodology 400 can continue as described.

Thereafter, or if the determination at 414 returns negative, methodology 400 can proceed to end at 416. Optionally, information can be output at or before 416 (or at other points in methodology 400) to provide feedback on, e.g., region or system data, generated models, testing details or results, and other aspects.

Variants or alternatives to the methodologies illustrated can be pursued without departing from the scope or spirit of the innovation. For example, a method described herein can comprise receiving region data related to a network region, wherein the region data includes region protocols. The method can also comprise generating a region model based on the region data and receiving system data related to system within the network region, wherein the system data includes system properties. The method can also comprise generating a system model based on the system data and generating a control plane model for the network region based on the region model and the system model.

Further embodiments can comprise providing an interface, wherein the interface receives an input that describes at least a portion of the region data or the system data.

Further embodiments can comprise testing the region protocols and the system properties within the control plane model. Test can include, e.g., testing reachability of the system; testing vulnerabilities of the control plane; and/or testing includes testing for control plane loops.

Further embodiments can comprise importing control plane information from an existing network region to source the region data.

The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with systems and methods as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

What is claimed is:

1. A control plane design tool, comprising:
   a processor;
   a memory coupled with the processor;
   a region component configured to define a region model of a network region, wherein the region model has region data including region protocols;
   a systems component configured to define a system model of a network system within the network region, wherein the system model has system data including system properties;
   a model generation component configured to generate a control plane model of the network region including the system model; and
   an interface component, wherein the interface component, based on the inspection, is configured to output outcomes of inspections or testing associated with the control plane model.

2. The control plane design tool of claim 1, further comprising:
   a test component configured to test the region protocols and the system properties within the control plane model.

3. The control plane design tool of claim 2, wherein the test component tests reachability of the system.

4. The control plane design tool of claim 2, wherein the test component tests vulnerabilities of the control plane.

5. The control plane design tool of claim 2, wherein the test component tests for control plane loops.

6. The control plane design tool of claim 2, wherein the test component inspects the control plane model for one or more errors, and in response to finding one or more errors, provides new parameters for region data or system data to correct the one or more errors found.

7. The control plane design tool of claim 1, further comprising:
   a traffic component configured to determine load on the system based on the control plane model.

8. The control plane design tool of claim 1, further comprising:
   an definition component configured to define the region protocols.

9. The control plane design tool of claim 1, further comprising:
   an import component configured to import control plane information from an existing network region to source the region data.

10. The control plane design tool of claim 1, wherein the region protocols comprise: a Border Gateway Protocol Labeled Unicast protocol and an Ethernet Virtual Personal Network protocol, and wherein the system properties comprise: a functionality of the network system and a behavior of the network system.

11. A computer implemented method, comprising:
receiving region data related to a network region, wherein the region data includes region protocols;
generating a region model based on the region data;
receiving system data related to system within the network region, wherein the system data includes system properties;
generating a system model based on the system data;
generating a control plane model for the network region based on the region model and the system model; and
outputting, via an interface component, outcomes of inspections or testing associated with the control plane model.

12. The method of claim 11, further comprising:
testing the region protocols and the system properties within the control plane model.

13. The method of claim 12, wherein testing includes testing reachability of the system.

14. The method of claim 12, wherein the testing includes testing vulnerabilities of the control plane.

15. The method of claim 12, wherein the testing includes testing for control plane loops.

16. The method of claim 11, further comprising:
importing control plane information from an existing network region to source the region data.

17. A system, comprising:
a processor; and
a memory coupled with the processor, the memory storing executable instructions that when executed by the processor cause the processor to effectuate operations comprising:
generating a region model of a network region based on region data including region protocols;
generating a subsystem model of a subsystem in the network region based on subsystem data including subsystem properties;
generating a control plane model for the network region based on the region model and the subsystem model; and
outputting outcomes of inspections or testing associated with the control plane model.

18. The system of claim 17, further comprising:
testing one or more of reachability, vulnerability, or loop presence in the control plane model.

19. The system of claim 17, further comprising:
receiving the region data or the subsystem data.

20. The system of claim 17, further comprising:
storing a protocol library including the region protocols or a subsystem library including the subsystem properties.

* * * * *